(No Model.)
P. S. SMOUT.
Refrigerating Can.
No. 231,367.                    Patented Aug. 17, 1880.
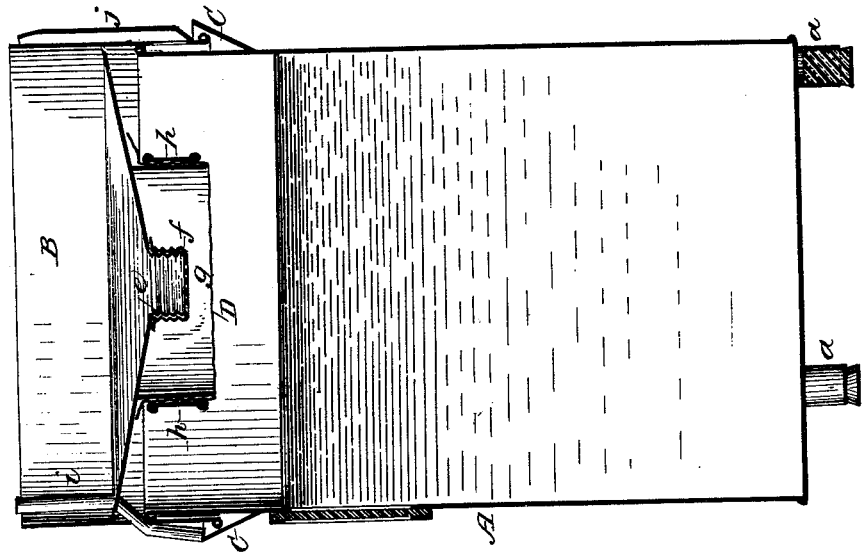
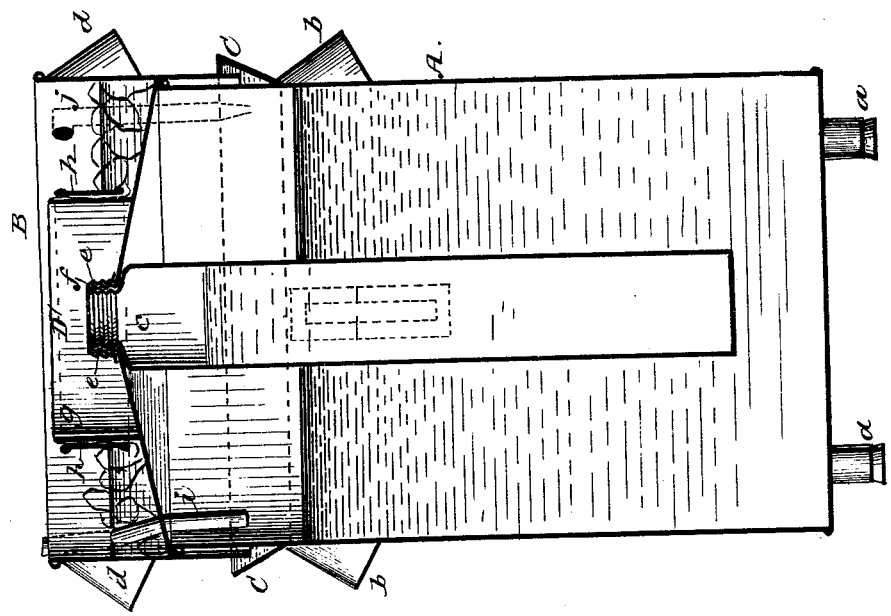
Witnesses
Fred. G. Dieterich
Albert H. Krause
Inventor
Peter S. Smout
by Louis Bagger & Co.
Attorneys

UNITED STATES PATENT OFFICE.

PETER S. SMOUT, OF DECORAH, IOWA.

REFRIGERATING-CAN.

SPECIFICATION forming part of Letters Patent No. 231,367, dated August 17, 1880.

Application filed May 13, 1880. (No model.)

*To all whom it may concern:*

Be it known that I, PETER S. SMOUT, of Decorah, in the county of Winneshiek and State of Iowa, have invented certain new and useful Improvements in Refrigerating-Cans; and I do hereby declare that the following is a full, clear, and exact description of the invention, which will enable others skilled in the art to which it appertains to make and use the same, reference being had to the accompanying drawings, which form a part of this specification, and in which—

Figure 1 is a vertical section of my improved refrigerant-can, and Fig. 2 is a similar view thereof with the strainer in position.

This invention contemplates improvements in refrigerant-cans specially designed for milk, which is also adapted to serve as a strainer; and it consists of a can or vessel for holding the liquid to be cooled combined with a pan or reservoir with a depending tube for holding the refrigerant or cooling liquid; and, secondly, of the reservoir with a central gauze-covered opening or tube, and adapted to permit of the attachment thereto of a second straining device, substantially as hereinafter more fully set forth.

In the accompanying drawings, A indicates a vessel or can for holding the liquid to be cooled, standing on heat-non-conducting or corked legs *a a*. The opposite sides of the can have hand-holds or ears *b b*, for handling the same. In one side thereof is also a glass-covered opening, to ascertain the height of the liquid therein.

An annular trough or chamber, C, encircles the upper end of the vessel or can A in such manner as to secure the drippings or overflow from the reservoir or pan superposed upon the can, and which trough or chamber, when overflowed, prevents the passage of air into the can A through any aperture except the evaporating-tube *i*, hereinafter set forth and described.

B is the reservoir for holding the refrigerant or cooling-liquid, having also hand-holds or ears *d*, for its convenient handling. Its bottom is conical, with a central opening or tube, *e*, having both an internal and an external screw-thread. Fitted in its internal screw-thread is a dependent tube, *c;* or this tube may be soldered or permanently attached around the opening or tube *e*.

The refrigerant or cooling-liquid is placed in the pan or reservoir, filling the tube *c*, and the tube submerged in the liquid to be cooled in the can or vessel A, which will be cooled or kept in a cool state by the transmission of the cold from the cooling-liquid in the tube *c* to the whole body of the milk in vessel or can A.

Upon the upper end of the screw-threaded tube *e* is screwed a gauze-covered cap, *f*, while fitted over an annular rim or flange, *g*, surrounding the gauze-covered cap *f* and tube *e*, and secured to the bottom of the pan or reservoir B, is a finer gauze covering, D, which is confined around or upon the flange or rim *g* by a ring, *h*, slipped around the same.

A vent-tube, *i*, passes obliquely through the pan or reservoir B, with one end communicating with the interior of the can and the other end with the external air, which tube may be sealed air-tight with a cork or plug at pleasure.

A second tube or pipe, *j*, soldered or fastened to the outside of the pan or reservoir B, has one end communicating with the chamber outside of the reservoir or pan, while its other end empties what would overflow the pan or reservoir into the waste trough or chamber C.

To use the reservoir or pan as a screen or strainer, it being removed from the can or vessel A, and the tube *c* detached or unscrewed, it is inverted and placed in position upon the vessel or can, the coarser strainer *f* and finer strainer *g* having been previously adjusted in position, if not already in place, when it is ready to serve the purpose desired. The lower end of the tube *c* is closed.

Having thus fully described my invention, I claim and desire to secure by Letters Patent of the United States—

1. In a combined strainer and refrigerant-can, the pan B, having the vent-tube *i*, waste-water tube *j*, and its centrally-tapering bottom provided around its opening with an internally and externally screw-threaded tube, *e*, to permit of the attachment thereto of the refrigerant tube or vessel *c*, or of the gauze-covered cap *f*, in combination with vessel A, having the external surrounding water-chamber C, substantially as and for the purpose set forth.

2. In a milk or other liquid refrigerant can, the pan or reservoir B, having the central communicating depending tube, c, and the overflow or waste pipe j, in combination with the can or vessel A, having the annular waste-liquid chamber C, and in combination with the evaporating-tube i, substantially as and for the purpose set forth.

In testimony that I claim the foregoing as my own I have hereto affixed my signature in presence of two witnesses.

PETER S. SMOUT.

Witnesses:
S. W. MATTISON,
WILLIAM J. SCHMITZ.